(12) United States Patent
Tenbroek et al.

(10) Patent No.: US 9,338,664 B2
(45) Date of Patent: May 10, 2016

(54) WIRELESS COMMUNICATION UNIT, INTEGRATED CIRCUIT AND METHOD THEREFOR

(71) Applicant: MediaTek Singapore Pte. Ltd., Singapore (SG)

(72) Inventors: Bernard Mark Tenbroek, West Malling (GB); Walid Youssef Ali-Ahmad, Beirut (LB)

(73) Assignee: Mediatek Singapore Pte. Ltd., Solaris (SG)

( * ) Notice: Subject to any disclaimer, the term of this patent is extended or adjusted under 35 U.S.C. 154(b) by 456 days.

(21) Appl. No.: 13/771,093

(22) Filed: Feb. 20, 2013

(65) Prior Publication Data

US 2013/0217343 A1 Aug. 22, 2013

Related U.S. Application Data

(60) Provisional application No. 61/601,964, filed on Feb. 22, 2012, provisional application No. 61/730,841, filed on Nov. 28, 2012.

(51) Int. Cl.
*H04B 17/00* (2015.01)
*H04W 24/00* (2009.01)
*H04B 17/12* (2015.01)
*H04B 17/14* (2015.01)

(52) U.S. Cl.
CPC ............ *H04W 24/00* (2013.01); *H04B 17/12* (2015.01); *H04B 17/14* (2015.01)

(58) Field of Classification Search
CPC ........ H04B 17/12; H04B 17/14; H04W 24/00

USPC ..................... 455/67.11, 67.14, 77
See application file for complete search history.

(56) References Cited

U.S. PATENT DOCUMENTS

| | | | | |
|---|---|---|---|---|
| 5,253,188 A | * | 10/1993 | Lee et al. ................ | 702/183 |
| 5,574,981 A | * | 11/1996 | Ahonen ................ | 455/67.14 |
| 2002/0039904 A1 | * | 4/2002 | Anderson ............. | G01S 5/02 455/456.1 |
| 2006/0197538 A1 | * | 9/2006 | Leinonen et al. ........ | 324/533 |
| 2008/0182537 A1 | * | 7/2008 | Manku ................. | H04B 1/12 455/226.1 |
| 2010/0311339 A1 | | 12/2010 | Chung | |

(Continued)

FOREIGN PATENT DOCUMENTS

| | | |
|---|---|---|
| CN | 1781298 A | 5/2006 |
| CN | 1917685 A | 2/2007 |

(Continued)

OTHER PUBLICATIONS

St Ericsson, Frequency Band support, pp. 1-14, Apr. 16, 2009.

(Continued)

*Primary Examiner* — Ayodeji Ayotunde
(74) *Attorney, Agent, or Firm* — Optimus Patents US, LLC

(57) ABSTRACT

A wireless communication unit is described that includes a transceiver; at least one antenna port operably coupled to the transceiver via at least one antenna switch; a radio frequency part of the transceiver that includes at least one tuneable radio frequency (RF) component; and a test signal generator for generating an RF test signal for receiver calibration. The radio frequency part includes a coupler located between the at least one tuneable RF component and the at least one antenna switch for coupling the RF test signal to or from the radio frequency part for calibration.

21 Claims, 10 Drawing Sheets

(56) References Cited

U.S. PATENT DOCUMENTS

2011/0007675 A1 1/2011 Chiou
2012/0129469 A1* 5/2012 Lorenz .............. H01Q 3/2605
455/73

FOREIGN PATENT DOCUMENTS

| CN | 101015126 A | 8/2007 |
| CN | 101090279 A | 12/2007 |
| CN | 101641872 A | 2/2010 |
| CN | 102396105 A | 3/2012 |
| CN | 102480315 A | 5/2012 |
| CN | 102694758 A | 9/2012 |

OTHER PUBLICATIONS

Lien Chien et al., Title: Radio Frequency Modules Capable of Self-Calibration, pending U.S. Appl. No. 13/417,314, filed Mar. 11, 2012.

* cited by examiner

WIRELESS COMMUNICATION UNIT, INTEGRATED CIRCUIT AND METHOD THEREFOR

CROSS REFERENCE TO RELATED APPLICATIONS

This application claims the benefit of U.S. provisional application No. 61/601,964, filed on Feb. 22, 2012, and U.S. provisional application No. 61/730,841, filed on Nov. 28, 2012. The entire contents of the related applications are incorporated herein by reference.

BACKGROUND

The field of this invention relates generally to radio frequency (RF) modules for wireless communication units and more particularly to RF transceiver front end modules capable of supporting self-calibration.

Wireless communication units, e.g. portable radios, telephones, etc., conventionally supported operation in a single radio frequency (RF) band, i.e. the operational band employed by the communication system. However, due to the rapid growth of mobile communications, there has been a comparable increase in the amount of spectrum that is required to support the various radio frequency standards, systems and services that are now available to mobile users. Consequently, as radio frequency (RF) communication systems have evolved, there has been a recent trend for mobile communication devices to support communications in a plurality of RF bands, for example to support communications across a plurality of communication standards or geographical regions. Currently, a typical transceiver adapted to support communication within, for example, a Universal Mobile Telecommunications System (UMTS) may be required to support more than ten distinct frequency bands.

FIG. 1 illustrates a simple block diagram of a typical mobile (wireless) communication unit (sometimes referred to as a mobile subscriber unit (MS) in the context of cellular communications or a user equipment (UE) in terms of a $3^{rd}$ generation partnership project (3GPP™) communication system). The wireless communication unit 100 contains an antenna 102 preferably coupled to a duplex filter or antenna switch 104 that provides isolation between receive and transmit chains within the wireless communication unit 100.

The receiver chain, as known in the art, includes receiver front-end circuitry 106 (effectively providing reception, filtering and intermediate or base-band frequency conversion). The receiver front-end circuitry 106 is serially coupled to a signal processing function 108. A controller 114 is also coupled to the receiver front-end circuitry 106 and the signal processing function 108 (generally realised by a digital signal processor (DSP)). The controller 114 is also coupled to a memory device 116 that selectively stores operating regimes, such as decoding/encoding functions, synchronisation patterns, code sequences, and the like.

As regards the transmit chain, this essentially includes transmitter/modulation circuitry 122 and a power amplifier 124 that is operably coupled to the antenna 102. The transmitter/modulation circuitry 122 and the power amplifier (PA) 124 are operationally responsive to the controller 114. A coupler 110 is located between the PA 124 and the antenna switch 104 and arranged to couple off a portion of the signal being transmitted to a feedback path and thereafter to baseband processing circuitry to enable the transmit signal to be optimised to the prevailing conditions of the wireless communications unit and/or the prevalent radio conditions, e.g. optimising a power control of the transmitted signal based on the vicinity of a receiving communication unit.

However, the cost of supporting a wide frequency range covering many frequency bands or communication standards in such a wireless communication unit is that many parallel transceiver circuits are required to fit within the wireless communication unit and/or one or more of the parallel transceiver circuits needs to be tuneable to operate across multiple frequency ranges. A number of adverse effects follow from either of these solutions within the wireless communication unit, including requiring higher quality of RF components that consume either significant amounts of silicon area or module board area. Furthermore, these solutions also increase design complexity in order to meet performance requirements simultaneously over all the supported frequency bands.

Thus, a need exists for an improved architecture and method of operation therefor that supports multiple frequency ranges and/or multiple communication standards.

SUMMARY

Accordingly, the invention seeks to mitigate, alleviate or eliminate one or more of the above mentioned disadvantages singly or in any combination. Aspects of the invention provide a wireless communication unit, an integrated circuit, and a method therefor as described in the appended claims.

According to a first aspect of the invention, there is provided a wireless communication unit comprising a transceiver, at least one antenna port operably coupled to the transceiver via at least one antenna switch, a radio frequency part of the transceiver that comprises at least one tuneable radio frequency (RF) component, and a test signal generator for generating an RF test signal for calibration. The radio frequency part comprises a coupler located between the at least one tuneable RF component and the at least one antenna switch for coupling the RF test signal to the radio frequency part for calibration.

Thus, in one example embodiment, a transceiver is capable of calibrating itself by generating an RF test signal that is routed through one or more tuneable RF components but avoids passing through the antenna switch.

According to an optional feature, a signal processor may be operably coupled to a receiver such that the signal processor is arranged to receive the RF test signal output from the at least one tuneable RF component and adjust the at least one tuneable RF component in response thereto. In this manner, the signal processor may be able to selectively adjust one or more tuneable RF component dependent upon its influence on the RF test signal that is passed therethrough.

According to an optional feature, the signal processor may be arranged to determine a performance characteristic of the at least one tuneable RF component based on the received RF test signal, compare the determined response signal with a stored performance characteristic and adjust the at least one tuneable RF component in response thereto. In this manner, the signal processor may be able to fine-tune a performance characteristic over multiple iterations in order to approach a (stored) ideal performance characteristic.

According to an optional feature, the at least one antenna switch may comprise at least one of: at least one single-pole multiple-throw antenna switch, a multiple-throw multiple-pole antenna switch.

According to an optional feature, the coupler may comprise a radio frequency coupling component, such as at least one further antenna switch or at least one capacitive element or a directional coupler.

According to an optional feature, the transceiver may comprise a plurality of transmit and/or receive paths, where each path comprises at least one tuneable RF component. In this manner, examples of the invention may be employed in multi-band wireless communication units whereby each receiver operational in each band may be self-calibrated.

According to an optional feature, the at least one tuneable RF component may comprise at least one from a group comprising: a tuneable RF filter, a tuneable RF amplifier. In this manner, the performance characteristics of one or more from a plurality of tuneable RF components can be determined and adjusted for.

According to an optional feature, the at least one antenna port may comprise a first antenna port for coupling to a transmit antenna and a second antenna port for coupling to a receive antenna. In this manner, the wireless communication unit may support separate antennas for transmit and receive operation, thereby assisting in the selection of specific receive paths to be self-calibrated.

According to an optional feature, the antenna switch may comprise a single-pole multiple-throw antenna switch. In one example, the at least one single-pole multiple-throw antenna switch may comprise at least one further single-pole multiple-throw antenna switch arranged in parallel with the at least one single-pole multiple-throw antenna switch.

According to an optional feature, the wireless communication unit may comprise a signal processor operably coupled to a transmitter part, wherein the signal processor may be arranged to receive the RF test signal input to or output from the at least one antenna switch and adjust the at least one RF tuneable component in response thereto.

According to a second aspect of the invention, there is provided an integrated circuit comprising a front end module having at least one antenna port operably coupled to a transceiver via at least one antenna switch. The integrated circuit comprises a radio frequency part of the transceiver that comprises at least one tuneable radio frequency (RF) component; an input port operably coupled to a test signal generator for receiving a generated RF test signal for calibration, wherein the radio frequency part comprises a coupler located between the at least one tuneable RF component and the at least one antenna switch for coupling the RF test signal to the radio frequency part for calibration.

According to a third aspect of the invention, there is provided a method of calibrating a transceiver comprising at least one tuneable radio frequency (RF) component and at least one antenna port operably coupled to at least one antenna switch via a transmit path or receive path. The method comprises generating a RF test signal for calibration; coupling the RF test signal into a location in the transmit path or receive path between the at least one tuneable RF component and the at least one antenna switch; processing the RF test signal after passing through the at least one tuneable RF component; and performing calibration on the processed signal.

According to a fourth aspect of the invention, a wireless communication unit comprises: a signal generator for generating an RF transmit signal for calibration; a transmitter that comprises a plurality of tuneable radio frequency (RF) components operably coupled to the signal generator; at least one multiple throw multiple pole antenna switch for receiving the RF transmit signal passed through one of the plurality of tuneable RF components at an input port; at least one antenna port operably coupled to the transmitter via the at least one first output port of the multiple throw multiple pole antenna switch; and a signal processor operably coupled to the transmitter via at least one second output port of the multiple throw multiple pole antenna switch for receiving and processing the RF transmit signal.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

Examples of the invention will be described in terms of a wireless communication unit, such as a user equipment, that comprises at least a transceiver having an antenna port that is operably coupled to an antenna. However, it will be appreciated by a skilled artisan that the inventive concept herein described may be embodied in any type of wireless communication unit comprising a transceiver, such as a base station.

Furthermore, examples of the invention describe a wireless communication unit comprising a transceiver; at least one antenna port operably coupled to the transceiver via at least one antenna switch; a radio frequency part of the transceiver that comprises at least one tuneable radio frequency (RF) component; and a test signal generator for generating an RF test signal for calibration. The radio frequency part comprises a coupler located between the at least one tuneable RF component and the at least one antenna switch for coupling the RF test signal to the radio frequency part for calibration.

In a receive context, a signal processor, operably coupled to a receiver of the radio frequency part, is arranged to receive the RF test signal output from the at least one RF tuneable component and adjust the at least one RF tuneable component (e.g. a receiver component) in response thereto.

In a transmit context, a signal processor (for example configured as a power detector or secondary receiver), operably coupled to a transmitter of the radio frequency part, is arranged to receive a RF test signal via the at least one RF tuneable component and either couple off the RF test signal input to, or output from, the at least one antenna switch and determine at least one characteristic of the RF test signal. In response thereto, the signal processor may adjust the at least one RF tuneable component (e.g. a transmitter component).

Figure 1:
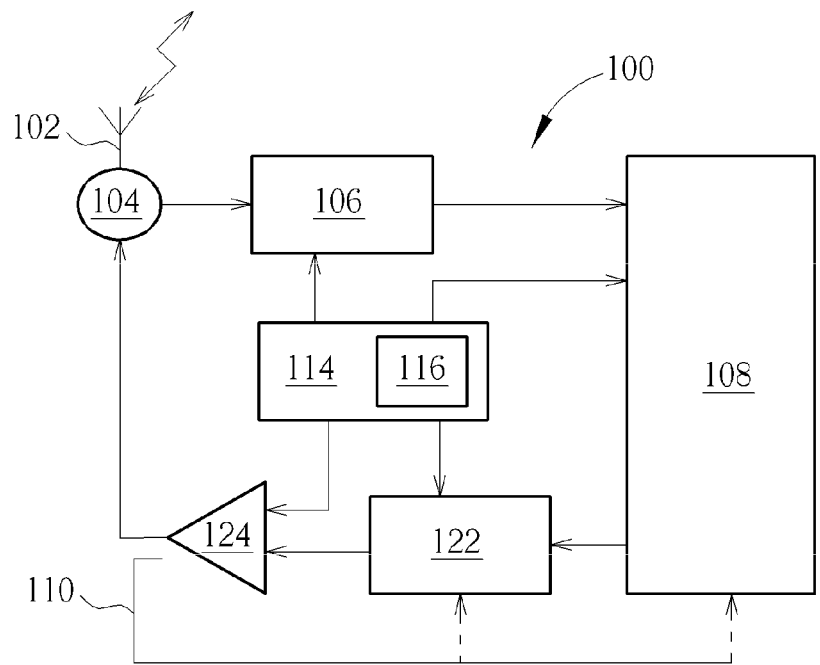
FIG. 1 illustrates a known wireless communication unit architecture.
Figure 2:
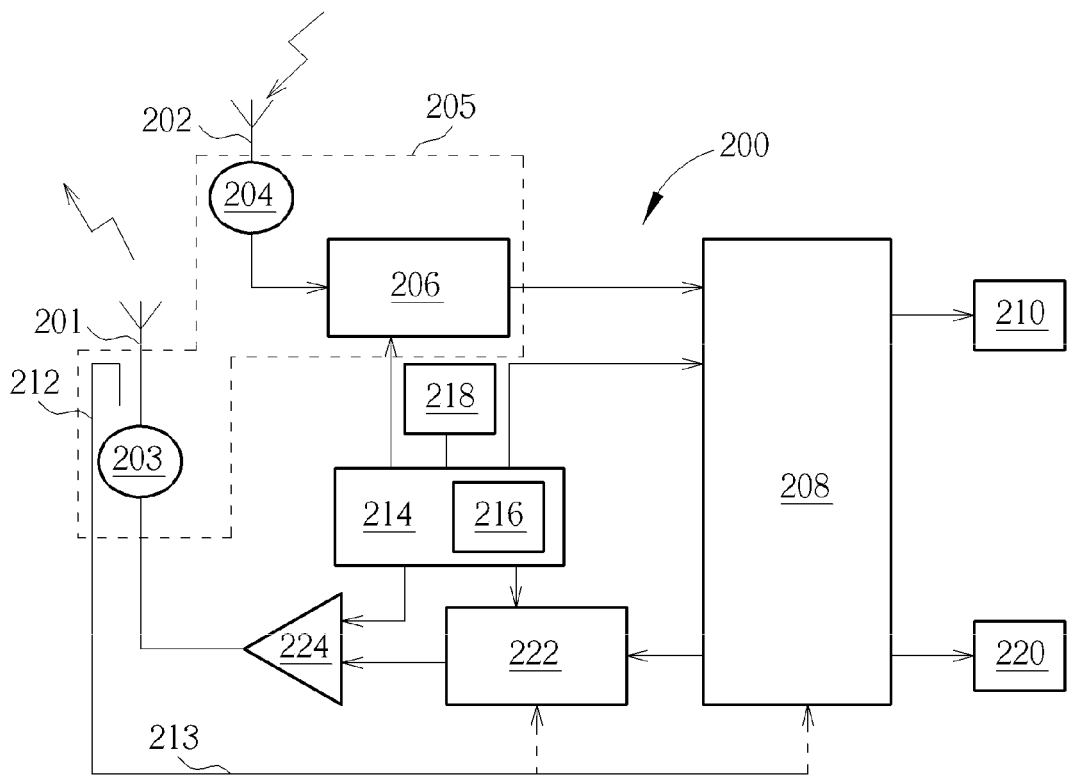
FIG. 2 illustrates an example of a wireless communication unit adapted to support example embodiments of the invention.

Referring first to FIG. 2, a block diagram of a wireless communication unit (sometimes referred to as a mobile subscriber unit (MS) in the context of cellular communications or a user equipment (UE) in terms of a $3^{rd}$ generation partnership project (3GPP™) communication system) is shown, in accordance with one example embodiment of the invention.

The wireless communication unit 200 contains a transceiver having an antenna 202 preferably coupled to an antenna switch and coupler arrangement 204. The receiver chain, as known in the art, includes receiver front-end circuitry 206 (effectively providing reception, filtering and intermediate or base-band frequency conversion). The receiver front-end circuitry 206 is serially coupled to a signal processing function 208. An output from the signal processing function 208 is provided to a suitable output device 210, such as a screen or flat panel display. The receiver chain also includes a controller 214 that maintains overall subscriber unit control. The controller 214 is also coupled to the receiver front-end circuitry 206 and the signal processing function 208 (generally realised by a digital signal processor (DSP)). The controller 214 is also coupled to a memory device 216 that selectively stores operating regimes, such as decoding/encoding functions, synchronisation patterns, code sequences, and the like. A timer 218 is operably coupled to the controller 214 to control the timing of operations (transmission or reception of time-dependent signals) within the wireless communication unit 200.

As regards the transmit chain, this essentially includes an input device 220, such as a keypad, coupled in series via signal processor function 208 through transmitter/modulation circuitry 222 and a power amplifier 224 to a second antenna 201. A coupler 212 and transmit antenna switch 203 are located between the power amplifier 224 and the transmit antenna 201. The coupler 212 routes a portion of the transmit signal output from the antenna switch 203 via feedback path 213 to baseband processing circuitry, for example located in either transmitter/modulation circuitry 222 or signal processor function 208. The transmitter/modulation circuitry 222 and the power amplifier 224 are operationally responsive to the controller 214.

As illustrated, a front end module/integrated circuit 205 may be used to house the various front end modules or components or circuits, such as in this example receive antenna switch and coupler arrangement 204, coupler 212, transmit antenna switch 203 and other RF components (not shown).

The signal processor function 208 in the transmit chain may be implemented as distinct from the processor in the receive chain. Alternatively, a single processor 208 may be used to implement processing of both transmit and receive signals, as shown in FIG. 2. Clearly, the various components within the wireless communication unit 200 can be realised in discrete or integrated component form, with an ultimate structure therefore being merely an application-specific or design selection.

Figure 3:
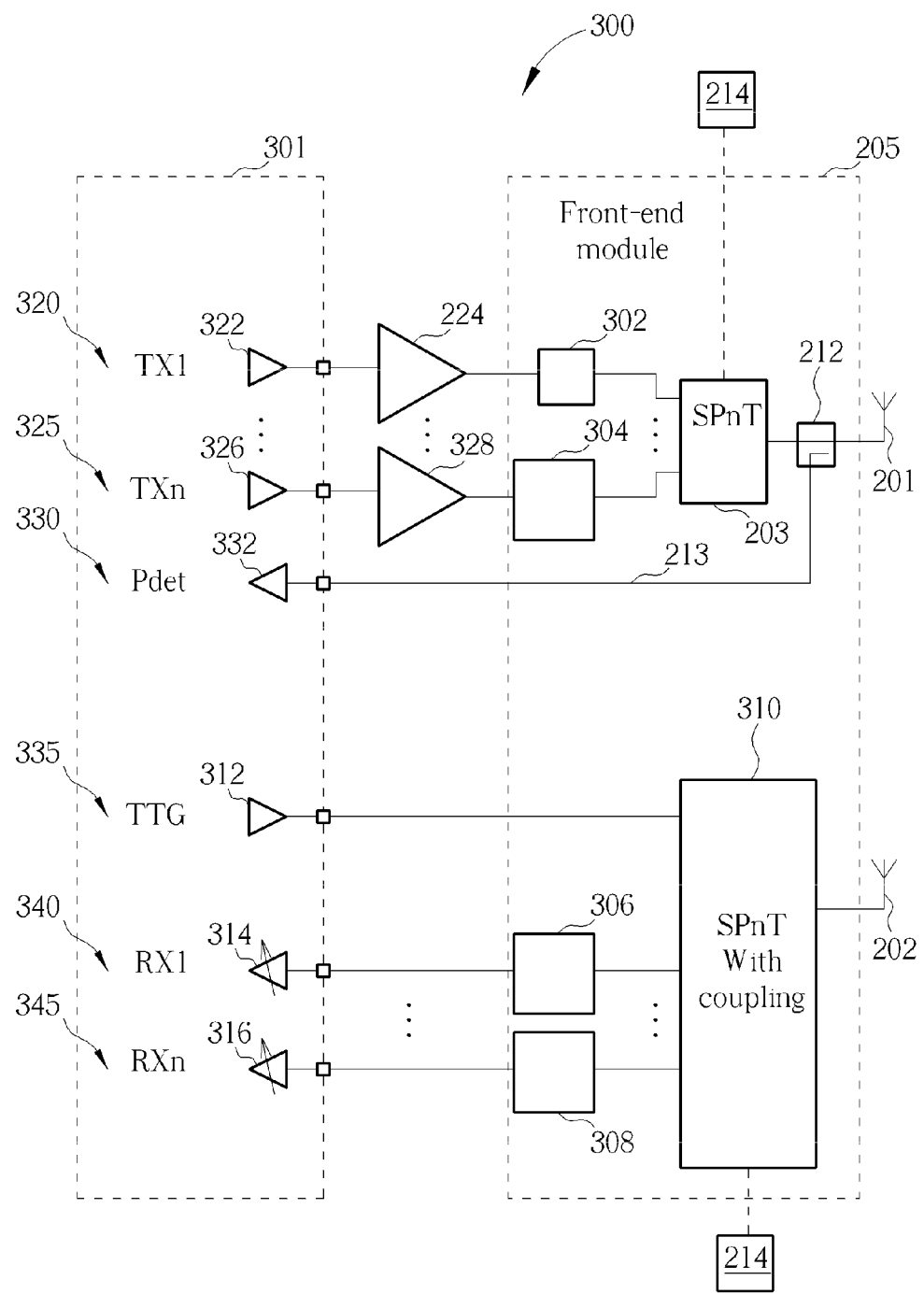
FIG. 3 illustrates an example of a transceiver architecture of the wireless communication unit of FIG. 2.

Referring now to FIG. 3, an example of a transceiver architecture 300 of the wireless communication unit of FIG. 2 is illustrated. The example transceiver architecture 300 comprises a transceiver module or integrated circuit 301 and a front end module or integrated circuit 205. In this example, both of the transceiver module or integrated circuit 301 and front end module or integrated circuit 205 comprise transmit and receive paths.

In this example, the transceiver architecture 300 comprises a number of parallel transmit paths (Tx1-Txn) and receive paths (Rx1-Rxn). For example, a first transmit path is a 2G high bandwidth transmit path 320 comprising a low power amplifier 322 within transceiver module or integrated circuit 301, a power amplifier 224 and a first front-end filter 302, for example a low-pass filter, within front end module or integrated circuit 205 to remove harmonic terms of the signal output from the power amplifier 224. The output from the first front-end filter 302 is input to a transmit antenna switch (also denoted as "SpnT") 203, which in some example may be a silicon on insulator (SOI) antenna switch and in some examples may be controlled by controller 214 of FIG. 2. A second transmit path is, for example, a 3G low bandwidth transmit path 325 comprising a low power amplifier 326 within transceiver module or integrated circuit 301, a power amplifier 328 and a further (second) front-end filter, for example a band-pass filter 304 within front end module or integrated circuit 205 to remove harmonic terms and noise of the signal output from the power amplifier 328. In one example, the filter 304 may be implemented as an inductance-capacitance (LC) band-pass circuit. In a second example, the filter 304 may be implemented as a inductance-capacitance (LC) notch filter to remove unwanted harmonic terms.

In this example, the transmit antenna switch 203, which in some examples is a SOI antenna switch, is illustrated as a multiple-pole single-throw switch, supporting one or more transmit paths with an output that is operably coupled to transmit antenna 201 via coupler 212. A portion of whichever transmit signal is passing through transmit antenna switch 203 is coupled off to a power detector path (Pdet) 330 and input to a power detector 332 via feedback path 213. The power detector path 330 may be used for transmit power control and/or tuning of transmit filter 304 or 302.

In this example, the transceiver architecture 300 also comprises a number of parallel receive paths (Rx1-Rxn). For example, a first receive path being, a 2G high band receive path 340 and a second receive path being a 3G low band receive path 345. The first and second receive paths 340, 345 are operably coupled to, and receive signals from, antenna 202 via a receive antenna switch, which in some example may be a silicon on insulator (SOI) antenna switch, and coupler arrangement (also denoted as "SPnT With coupling") 310. The front end module or integrated circuit 205 further comprises a first tuneable RF filter 306, for example a first band-pass filter, in the first receive path and a second tuneable RF filter 308, for example a second band-pass filter in the second receive path to remove unwanted received frequencies (e.g. out-of-band blocking or transmissions from other systems), transmit noise, etc. In one example, the first and second tuneable RF filters 306, 308 may be implemented as inductance-capacitance (LC) circuits. The output from the first tuneable RF filter 306 in the first receive path and the second tuneable filter 308 in the second receive path are respectively input to low noise tuneable radio frequency (RF) amplifiers 314, 316 within transceiver module or integrated circuit 301.

In one example of the receiver operation, a test tone generation (TTG) path 335 comprises a test signal generator 312 arranged to couple a radio frequency (RF) test signal to, say, the first receive path 340 or the second receive path 345 or further receive paths. Notably, in accordance with example embodiments of the invention, the coupling operation is performed between the receive antenna switch and coupler arrangement 310 and the first and second tuneable band-pass or band stop (notch) filters 306, 308. In this manner, the use of a TTG may be employed and directly coupled to one or more of a plurality of receiver paths (Rx1-Rxn) to enable more accurate frequency tuning of the first and/or second tuneable RF filters 306, 308 and/or one or more of the low noise tuneable RF amplifiers 314, 316.

Although examples of the invention have been described with respect to low-pass or band-pass filters within the front end module, it is envisaged that in other examples any suitable filters may be employed, for example band-pass, low-pass or band-reject (notch) filters.

Although some examples of the invention have been illustrated in the figures with respect to use of single-pole N-throw switches, it is envisaged that in other examples any suitable switch or number of connected switches may be employed, dependent for example on the number of transmit or receive paths being supported, the architecture employed or the wireless communication standards supported.

Although some examples of the invention have been illustrated in the figures with respect to use of tuneable RF filters or tuneable RF amplifiers, it is envisaged that in other examples any suitable tuneable RF component may be employed, dependent for example on the number of transmit or receive paths being supported, the architecture employed or the wireless communication standards supported.

Although examples of the invention have been described with respect to supporting certain wireless communication standards, such as 2G and 3G standards, it is envisaged that in other examples of the invention any wireless communication may be supported.

Figure 4:
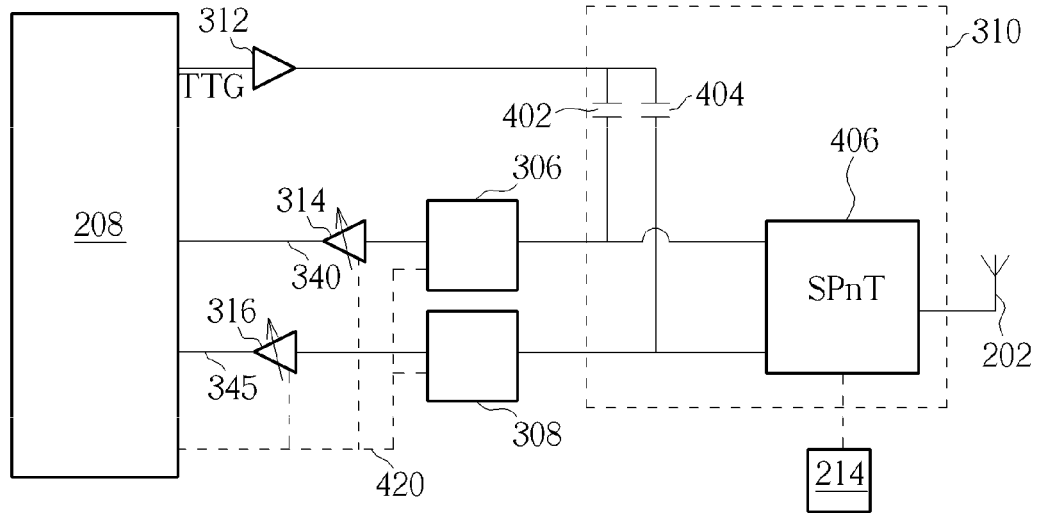
FIG. 4 illustrates one example of an antenna switch implementation for a receiver architecture of the wireless communication unit of FIG. 2.
Figure 5:
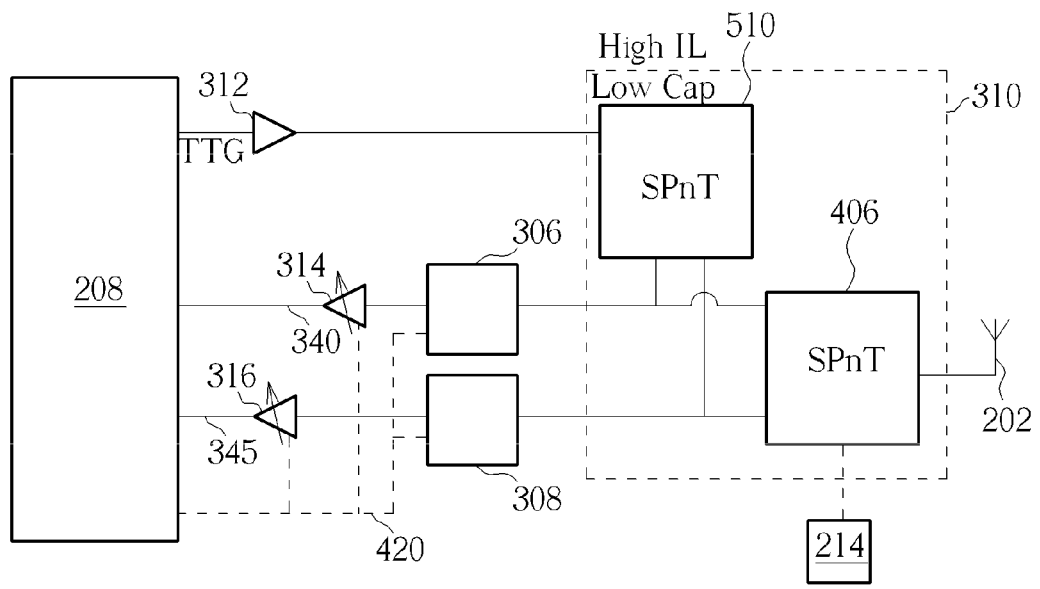
FIG. 5 illustrates a further example of an antenna switch implementation for a receiver architecture of the wireless communication unit of FIG. 2.

Examples of the receive antenna switch and coupler arrangement 310 are illustrated further with respect to FIG. 4 and FIG. 5.

Referring now to FIG. 4, one example of an antenna switch and coupler implementation of the wireless communication unit of FIG. 2 is illustrated. As described with respect to FIG. 3, in a first (normal receive) mode of operation, either of the first and second receive paths 340, 345 are operably coupled to, and receive signals from, antenna 202 via a receive antenna switch (also denoted as "SPnT") 406.

In a second (receive calibration) mode of operation, a test signal generator 312 (which in some examples may be incorporated in signal processor 208) is arranged to generate a RF test signal and couple the generated RF signal to, say, either or both of the first receive path 340 or the second receive path 345 for receive calibration purposes. The coupling operation in the example of FIG. 4 is performed via first capacitance 402 or second capacitance 404. In this mode of operation, neither the first nor second receive paths 340, 345 are operably coupled to, or receive signals from, antenna 202 via appropriate control and switching of the receive antenna switch 406. In one example, the appropriate control and switching of antenna switch 406 may be performed by a signal processor or controller, for example controller 214 of FIG. 2.

In this manner, by routing the RF test signal via the first tuneable band-pass filter 306 and low noise tuneable amplifier 314 in the first receive path and/or the second tuneable, e.g. band-pass, RF filter 308 and low noise tuneable RF amplifier 316 in the second receive path, the test signal fed back to a signal processing function, e.g. signal processor 208 of FIG. 2, may be processed. The signal processing function may then be able to determine performance characteristics of the respective receive path(s), such as determining a gain response across a range of frequencies, for one or more of the tuneable components in each path. The signal processing function may then be able to subsequently adjust one or more of the components that require adjusting via control signal 420 to optimise or improve their respective performance.

Referring now to FIG. 5, a further example of an antenna switch implementation of the wireless communication unit of FIG. 2 is illustrated. One example of an antenna switch and coupler implementation of the wireless communication unit of FIG. 2 is illustrated. As described with respect to FIG. 3, in a first (normal receive) mode of operation, either of the first and second receive paths 340, 345 are operably coupled to, and receive signals from, antenna 202 via a receive antenna switch 406.

In a second (receive calibration) mode of operation, a test signal generator 312 (which in some examples may be incorporated in signal processor 208) is arranged to generate a RF test signal and couple the generated RF signal to, say, either or both of the first receive path 340 or the second receive path 345 for receive calibration purposes. The coupling operation in the example of FIG. 5 is performed via appropriate control and switching of a further switch (also denoted as "SPnT") 510. In one example, the appropriate control and switching of antenna switch 406 and/or further switch 510 may be performed by a signal processor or controller, for example controller 214 of FIG. 2.

In this mode of operation, neither the first nor second receive paths 340, 345 are operably coupled to, or receive signals from, antenna 202, again via appropriate control and switching of the receive antenna switch 406. In this manner, by routing the RF test signal via the first tuneable band-pass filter 306 and low noise tuneable amplifier 314 in the first receive path and/or the second tuneable, e.g. band-pass, RF filter 308 and low noise RF tuneable amplifier 316 in the second receive path, the RF test signal fed back to a signal processing function, e.g. signal processor 208 of FIG. 2, may be processed. The signal processing function may then be able to determine performance characteristics of the respective receive path(s), such as determining a gain response across a range of frequencies, for one or more of the tuneable RF components in each path. The signal processing function may then be able to subsequently adjust one or more of the components that require adjusting via control signal 420 to optimise or improve their respective performance.

Figure 6:
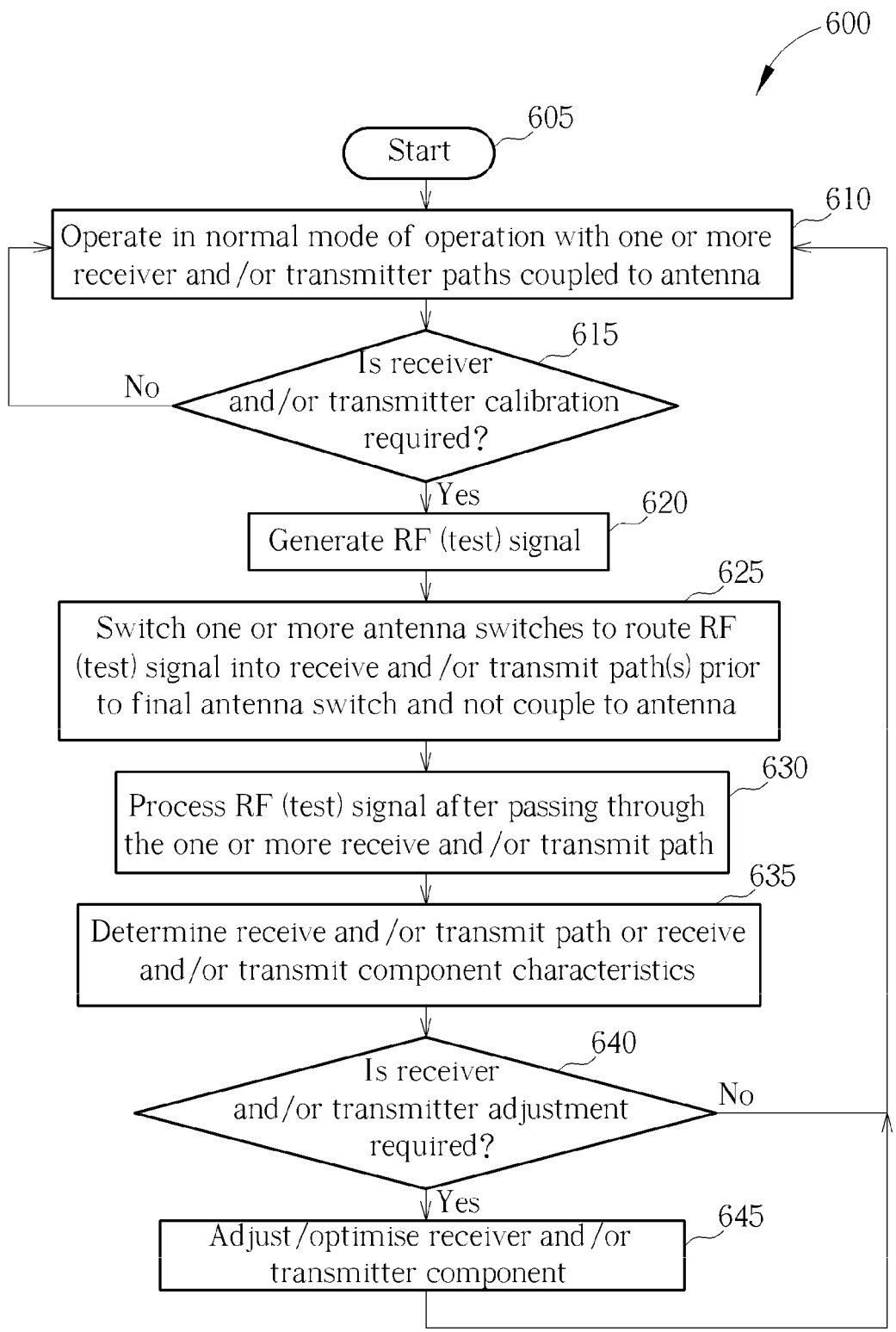
FIG. 6 illustrates an example flowchart of a method of tuning a tuneable component.

Referring now to FIG. 6, a flowchart 600 illustrates a method of self-calibration of a receiver and/or transmitter. The flowchart 600 starts at 605 and moves to 610 whereby the receiver and/or transmitter may be functioning in a normal operational mode, for example receiving and/or transmitting signals from the wireless communication unit's antenna. In alternative examples, the flowchart may skip this step and initialise the receiver and/or transmitter by performing a receiver and/or transmitter calibration routine upon start-up. A determination is then made in 615 as to whether receiver and/or transmitter calibration is desired or required. If no receiver and/or transmitter calibration is desired or required the process loops, for example back to 610.

If receiver and/or transmitter calibration is desired or required, then a radio frequency (RF) signal, such as a RF test signal or transmit signal, is generated in 620. Appropriate control and switching of one or more antenna switches (such as SOI receive antenna switch 406) is then performed in 625, with the test signal routed into one or more receive paths without passing through SOI receive antenna switch 406 and/or without passing to the antenna on a transmitter calibration. The RF test signal is passed through one or more tuneable components, such as first tuneable band-pass filter 306, low noise tuneable RF amplifier 314, pre-PA tuneable passband filter, first tuneable front-end filter 302, etc. In some examples, the RF test signal may be passed through multiple receive and/or transmit paths, either concurrently (to perform parallel processing of the respective receive and/or transmit paths) or consecutively (to perform serial processing of the respective receive and/or transmit paths), and therefore encompass subsequently routing the test signal through a second set of tuneable components.

The test signal output from the one or more receive and/or transmit paths is then processed in 630, e.g. by signal processor 208 of FIG. 2, and a determination made of the receive path and/or transmit path tuneable RF component performance characteristics in 635. A determination is then made as to whether an adjustment of any of the tuneable RF components is required in 640. In some examples, this may encompass comparing the determined performance characteristic with one or more stored performance characteristic, and identifying whether any difference (e.g. performance error) between, say, an ideal performance characteristic and a measured performance characteristic exceeds a threshold. If the difference is low or negligible, and the receiver and/or transmitter tuneable RF component does not require adjustment, then the process loops back to 610. If the difference is relatively high, for example exceeds a threshold, and the receiver and/or transmitter tuneable component does require adjustment, then the tuneable RF component is adjusted in 645 and the process loops back to 610.

In some examples, some or all of the steps illustrated in the flowchart may be implemented in hardware and/or some or all of the steps illustrated in the flowchart may be implemented in software.

Figure 7:
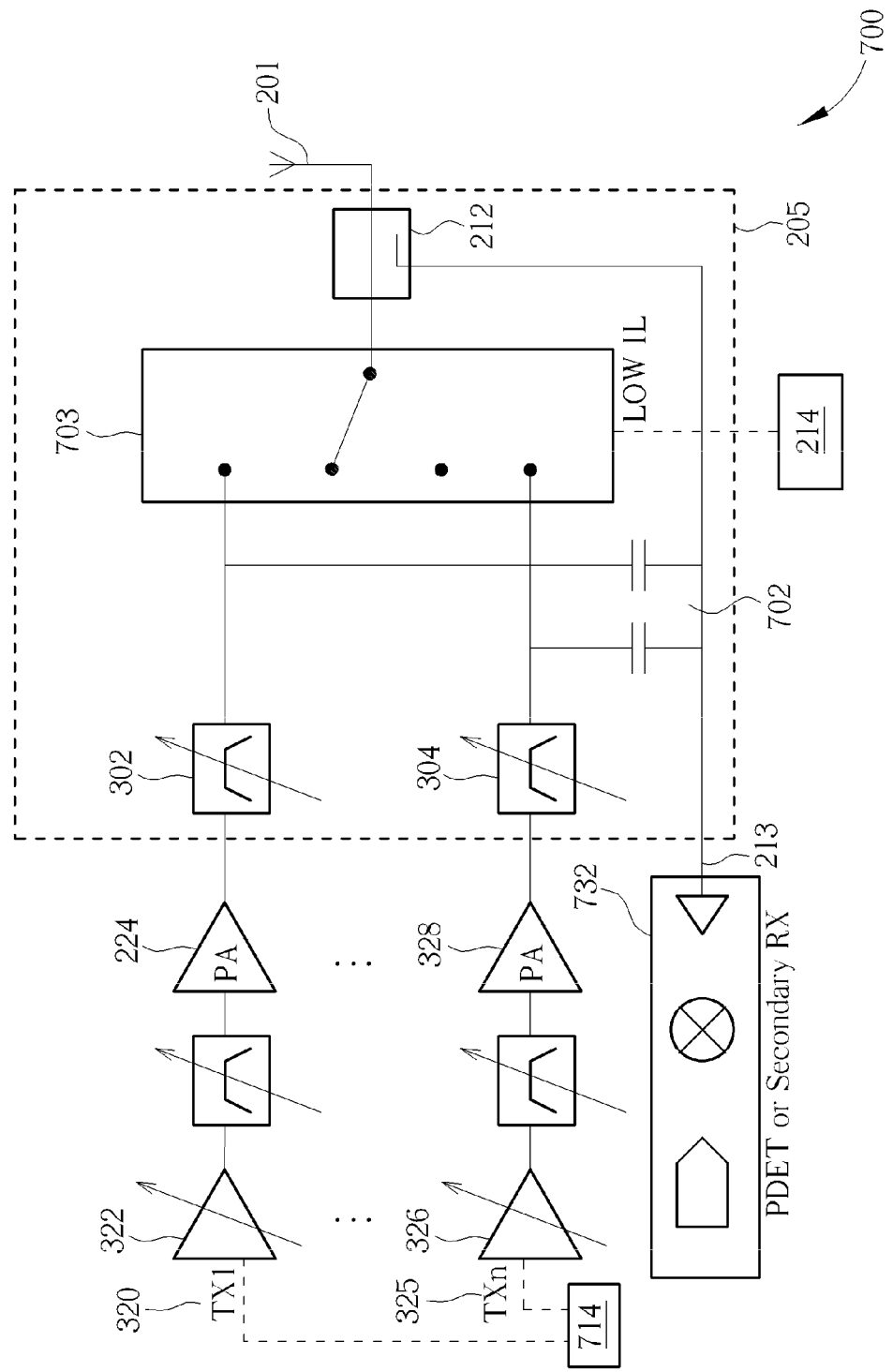
FIG. 7 illustrates an example of a transmitter architecture of the wireless communication unit of FIG. 2 that supports power detection, according to examples of the invention.

Referring now to FIG. 7 an example of a transmitter architecture 700 according to an example of the invention is illustrated. In this example, the transmitter architecture 700 comprises a number of parallel transmit paths (Tx1-Txn). For example, a first transmit path may be a 2G high-bandwidth transmit path 320 comprising a low power amplifier 322, a pre-PA tuneable passband filter, a power amplifier 224 and a first tuneable front-end filter 302 within front end module or integrated circuit 205. The first front-end filter 302 is arranged to remove harmonic terms and noise of the signal output from the power amplifier 224. The output from the first front-end filter 302 is input to a low insertion loss (IL) transmit antenna switch 703, which in some examples may be a silicon on insulator (SOI) antenna switch and in some examples may be controlled by a controller, say controller 214 of FIG. 2, as shown.

A second transmit path (of multiple transmit paths) may be, for example, a 3G low-bandwidth transmit path 325 comprising a further low power amplifier 326, a further pre-PA tuneable passband filter, a further power amplifier 328 and a further (second) tuneable front-end filter 304, located within front end module or integrated circuit 205. The second front-end filter 304 is arranged to remove harmonic terms and noise of the signal output from the power amplifier 328.

In one example, the first front-end filter 302 and/or further (second) front-end filter 304 may be implemented as an inductance-capacitance (LC) with tuneable component band-pass circuit.

In a second example, the first front-end filter 302 and/or further (second) front-end filter 304 may be implemented as an inductance-capacitance (LC) with tuneable component notch filter in order to remove unwanted harmonic terms.

In this example, the transmit antenna switch 703, which in some examples is a SOI antenna switch, is illustrated as a multiple-pole single-throw switch, supporting a plurality of transmit paths with an output that is operably coupled to transmit antenna 201 via coupler 212. In this example, each of the transmit paths, prior to the transmit antenna switch 703, is operably coupled to the feedback power detector path 213 via coupling capacitors 702. In this manner, the transmit power level prior to the transmit antenna switch 703 may be determined.

In addition, a transmit signal path within transmit antenna switch 703 is selected, for example by controller 214, to route a transmit signal from a particular transmit path through transmit antenna switch 703 to coupler 212. A portion of the selected transmit signal is coupled off to a feedback power detector path 213 and input to a power detector and/or secondary receiver 732. The transmit signal output from coupler 212 to the feedback path (assuming that the coupling loss for coupler 212 is accurately known), and thus applied to power detector and/or secondary receiver 732, may be used to determine suitable settings for transmit power control and/or tuning of transmit front-end filters 302, 304.

Thus, this example transmit architecture provides two distinct modes of operation. A first mode of operation allows coupling capacitors 702 to route the signal from transmit front-end filters 302, 304 to the power detector and/or secondary receiver 732 via the feedback power detector path 213. This allows the frequency and/or amplitude response of the tuneable components to be accurately determined. In this mode of operation, the controller 214 may be configured such that the transmit switch is coupled to a non-transmitting transmit path, thereby reducing a power level of the leakage signal on the (being-measured) transmit path via transmit antenna switch 703 and coupler 212, affecting the capacitively-coupled signal measurements. The coupling capacitors may be different values and may incorporate switch elements connected thereto (not shown) in order to increase isolation between the respective transmit paths.

A second mode of operation, routes a transmit signal via the antenna switch 703, with a portion of the signal applied to antenna 201 coupled via coupler 212 to feedback path 213.

In some examples, a transmit signal generator 714 may be operably coupled to a plurality of transmit paths to provide a transmit signal, for example a test tone or other suitable signal, to a respective transmit path for calibrating one or more tuneable RF components located within the respective transmit path. The transmit signal generator 714 may be operably coupled to the signal processor (e.g. power detector and/or secondary receiver 732) to enable the signal processor to compare the test tone or other suitable signal applied to the respective transmit path with a signal that has been routed via the transmit path and the feedback path in order to determine a performance characteristic change of the transmit signal affected by the one or more tuneable RF component(s).

Figure 8:
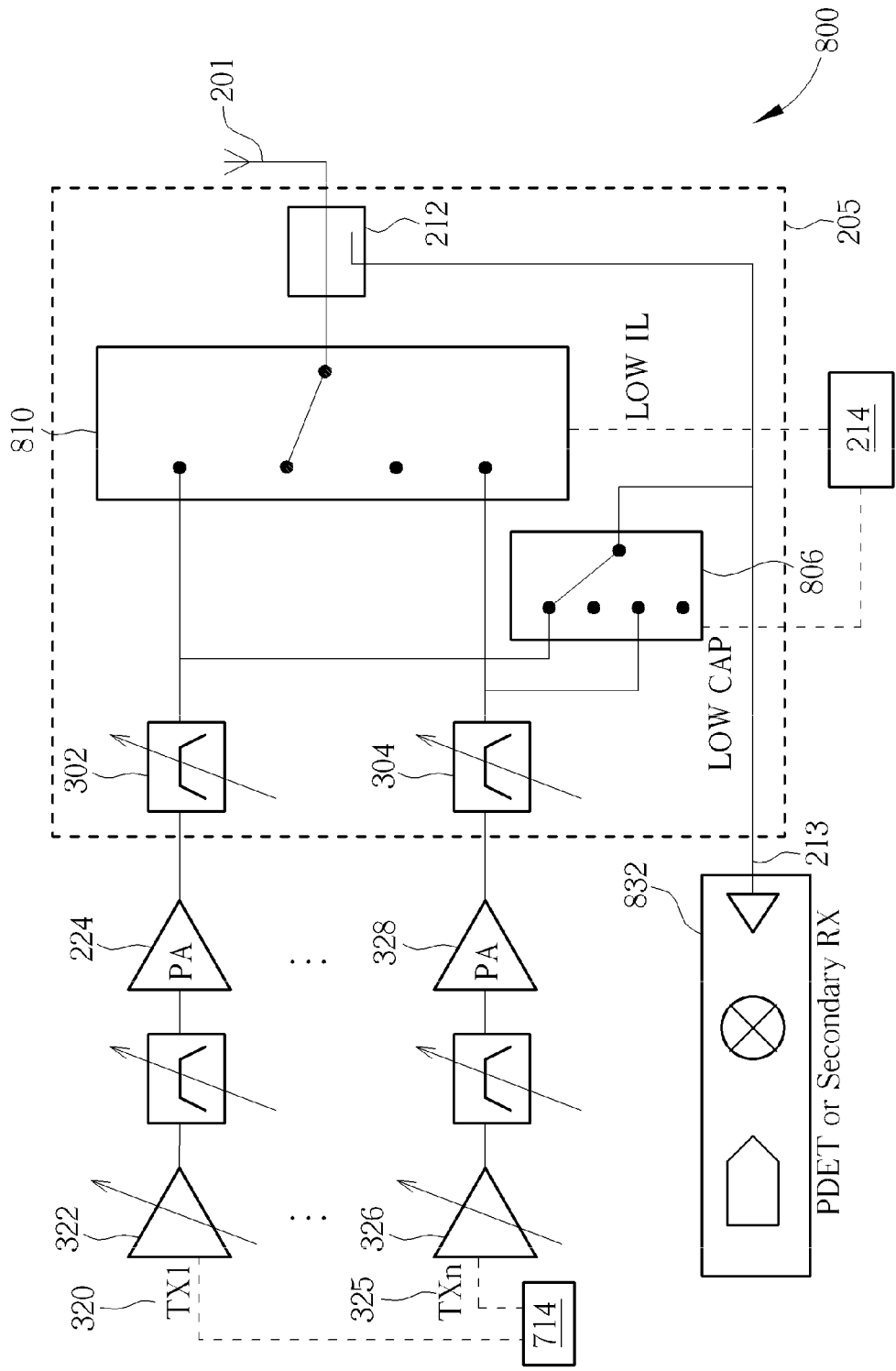
FIG. 8 illustrates a further example of a transmitter architecture of the wireless communication unit of FIG. 2 that supports power detection, according to examples of the invention.

Referring now to FIG. 8, a further alternative example of a transmitter architecture 800 according to examples of the invention is illustrated. The transmitter architecture 800 comprises similar implementation details to the transmitter architecture 700 of FIG. 7, and therefore only new elements will be described in order to minimise obfuscation of the description of this example. In this example, two transmit antenna switches 806 and 810 of the front end module or integrated circuit 205, are illustrated as a parallel arrangement of multiple-pole single-throw switches, supporting one or more transmit paths. An output of transmit antenna switch 810 routes a selected alternative transmit path to transmit antenna 201 via coupler 212. An output of transmit antenna switch 806 routes a selected transmit path to power detector or secondary receiver 832 via feedback path 213. The coupling operation in the example of FIG. 8 is performed via appropriate control and switching of both transmit antenna switches 806 and 810.

In one example, the appropriate control and switching of antenna switch 810 and/or further switch 806 may be performed by a signal processor or controller, for example controller 214 of FIG. 2. As shown in FIG. 8, the first transmitter 320 routes a transmit signal on first transmit path through antenna switch 806 to power detector or secondary receiver 832 via feedback path 213. The signal routed via feedback path 213 (carrying the signal from the first transmitter in this example) may be used for transmit power control and/or tuning of transmit amplifier 322 and/or transmit filter 302 or any other tuneable component. Notably, the controller 214 configures the second (or any other non-first) transmit path to the antenna, thereby providing a level of isolation between the first transmit path and the power detector or secondary receiver 832 via an alternative (leakage) path. In this manner, the isolation between ports of the antenna switch 806 plus the coupler loss in coupler 212 reduces the leakage power from the first transmitter via this path by a sufficiently large amount.

In this manner, a test signal can be applied to the first transmit path and routed to the power detector and/or secondary receiver 832 for calibration purposes, whilst the transmit antenna switch is operably coupled to a dummy transmit path, for example a transmit path that is unused at that time instant, i.e. the second transmit path. In this manner, the transmit power level prior to the transmit antenna switch 810 may be determined.

As illustrated, transmit antenna switch 806 replaces the (low capacitance value) coupling capacitive arrangement of FIG. 7 and is arranged to route the transmit signal from a first transmit path to the power detector and/or secondary receiver 832. In one example, the antenna switch 810 is selected/designed to exhibit low insertion loss characteristics to minimise loss of transmit power of the transmit radio signal passing therethrough. In one example, the antenna switch 806 is selected/designed to exhibit low capacitance characteristics in 'OFF' mode to maximize isolation when the transmit signal is routed via transmit antenna switch 810 and coupler 212 for power detection.

Figure 9:
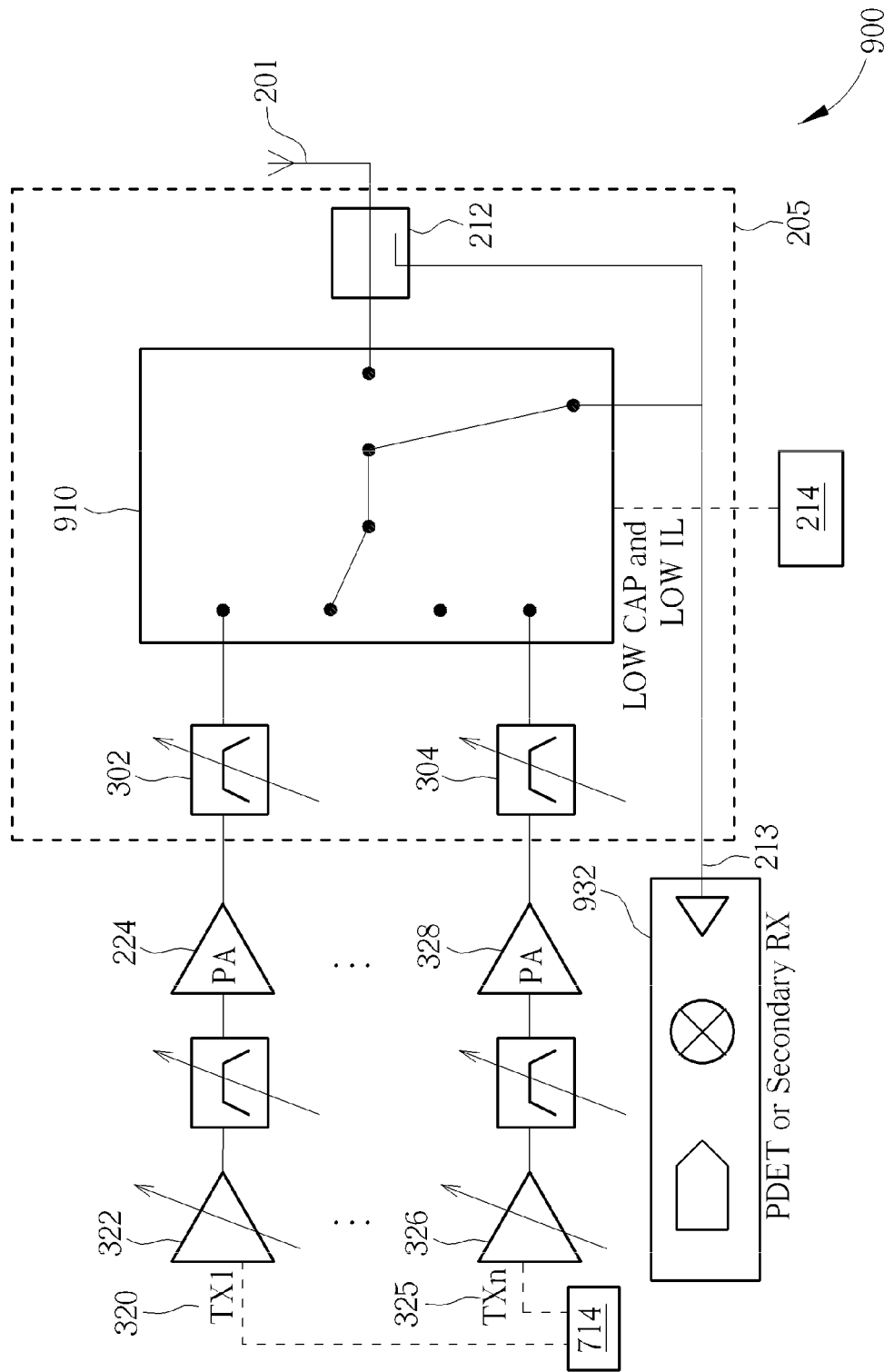
FIG. 9 illustrates a yet further example of a transmitter architecture of the wireless communication unit of FIG. 2 that supports power detection, according to examples of the invention.

Referring now to FIG. 9, a yet further example of a transmitter architecture 900 according to examples of the invention is illustrated. The transmitter architecture 900 comprises similar implementation details to the transmitter architectures 700 of FIG. 7, and therefore only new elements will be described in order to minimise obfuscation of the description of this example.

In this example, the transmit antenna switch 910 comprises a multiple-throw multiple-pole antenna switch 910 that is again controlled by a signal processor or controller, for example controller 214 of FIG. 2. The multiple-throw multiple-pole antenna switch 910 preferably exhibits low capacitance and low insertion loss characteristics, to allow transmit signals to be routed therethrough without unduly affecting the transmit signal's characteristics. The multiple-throw multiple-pole antenna switch 910 is able to route a selected transmit signal to the power detector feedback path 213 via either a direct output from the multiple-throw multiple-pole antenna switch 910, as illustrated, or via the feedback from the coupler 212. In this manner, a calibration of the transmit power level can be determined at an output of the multiple-throw multiple-pole antenna switch 910 by selection of the appropriate output path of multiple-throw multiple-pole antenna switch 910.

In some examples, such a transmit signal path may be used when a test tone signal is generated for transmit path calibration. In this example and other examples, such a test tone may be successively (or randomly) applied to various of the multiple transmit paths.

In some examples, signals carried on the transmit signal path may be applied to a power detector for transmit path 'power' calibration, or applied to a secondary receiver to enable power, phase, frequency and other signal parameters to be determined and possibly corrected for with appropriate tuning control of transmit amplifier 322, 326 and/or transmit filter 302, 304 or any other tuneable component(s). In this example and other examples, such a test tone may be successively (or randomly) applied to various of the multiple transmit paths.

Figure 10:
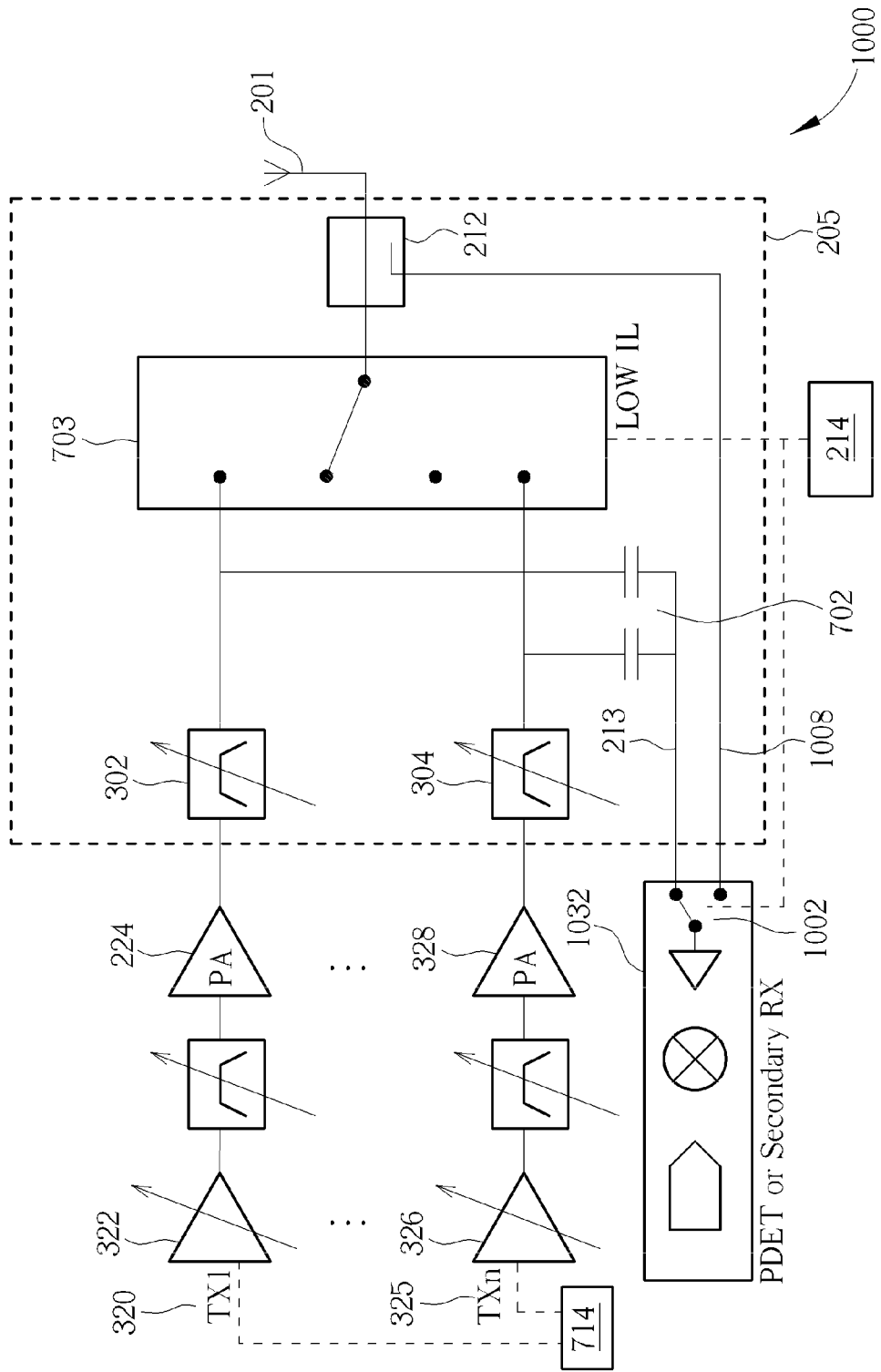
FIG. 10 illustrates a still yet further example of a transmitter architecture of the wireless communication unit of FIG. 2 that supports power detection, according to examples of the invention.

Referring now to FIG. 10 a still further example of a transmitter architecture 1000 according to examples of the invention is illustrated. The transmitter architecture 1000 comprises similar implementation details to the transmitter architecture 700 of FIG. 7, and therefore only new elements will be described in order to minimise obfuscation of the description of this example.

In this example, a first feedback path 213 routes the transmit signal being tested via one of the coupling capacitors 702 to the power detector and/or secondary receiver 1032. In this manner, the adapted characteristics of the test transmit signal routed via one of the transmit paths can be monitored and possibly corrected for with appropriate tuning control of transmit amplifier 322, 326 and/or transmit filter 302, 304 or any other tuneable component(s).

In this example, a second transmit feedback path 1008 is supported that routes a portion of the transmit signal being coupled via coupler 212 to the antenna 201 to the power detector and/or secondary receiver 1032. In this manner, the adapted characteristics of the test or live transmit signal routed via one of the transmit paths and notably taking into account the performance characteristics of the antenna switch 703 and coupler 202 can be monitored and possibly corrected for with appropriate tuning control of transmit amplifier 322, 326 and/or transmit filter 302, 304 or any other tuneable component(s).

As illustrated, the first feedback path 213 and the second transmit feedback path 1008 are input to a single-pole multiple-throw switch 1002, under control of a signal processor or controller, for example controller 214 of FIG. 2. The single-pole multiple-throw switch 1002 routes the selected feedback signal to either the power detector and/or secondary receiver 732. In this manner, a calibration of the transmit power level can be determined at an input of the multiple-throw multiple-pole antenna switch 703 or taking into account the effects of the coupler 212 by selection of the appropriate output path of the multiple-throw multiple-pole antenna switch 703.

Figure 11:
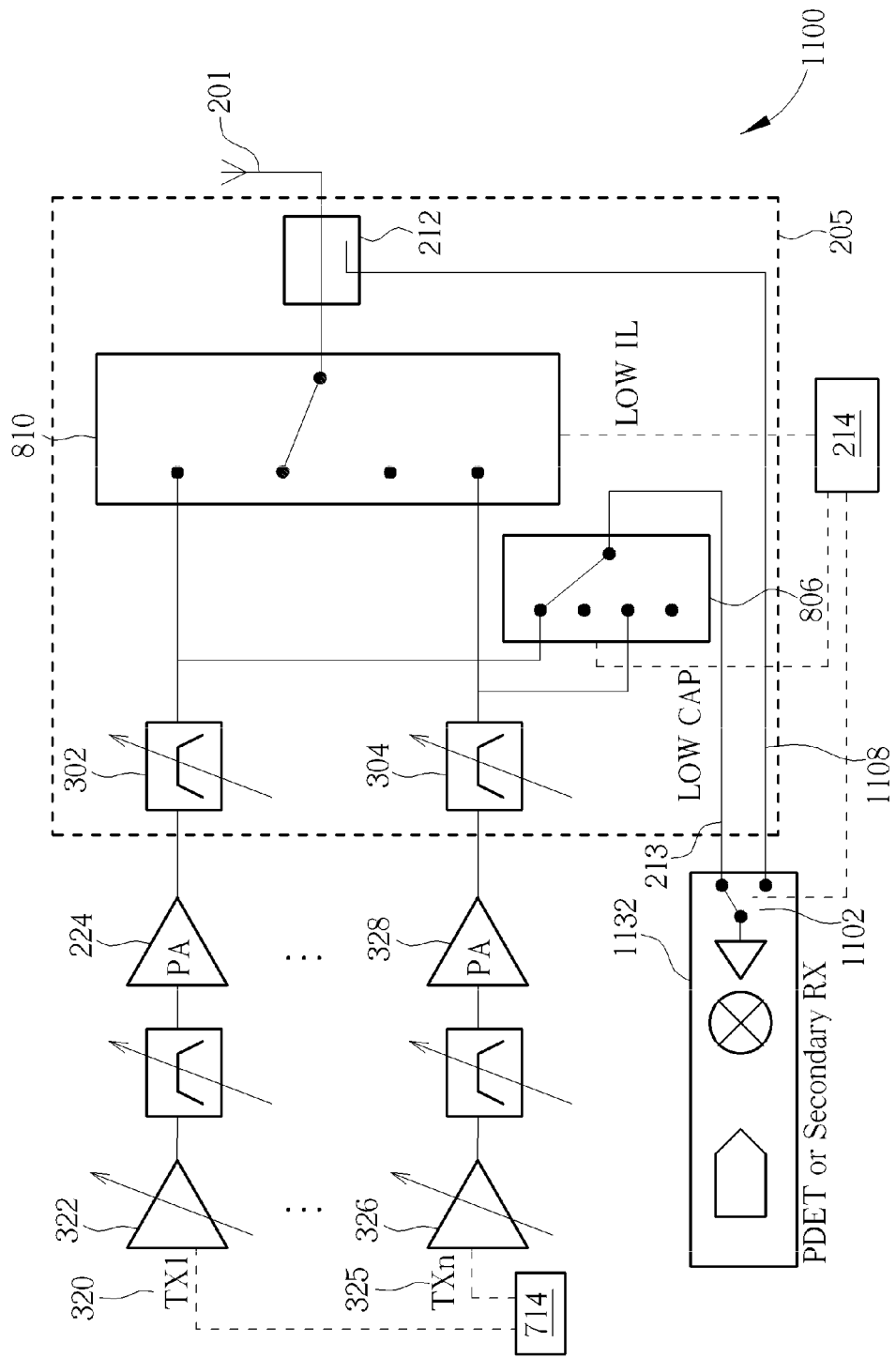
FIG. 11 illustrates a still yet further example of a transmitter architecture of the wireless communication unit of FIG. 2 that supports power detection, according to examples of the invention.

Referring now to FIG. 11 a still yet further example transmitter architecture 1100 according to examples of the invention is illustrated. The transmitter architecture 1100 comprises similar implementation details to the transmitter architectures 800 of FIG. 8, and therefore only new elements will be described in order to minimise obfuscation of the description of this example. In this example, which uses the multiple parallel transmit antenna switches arrangement, a first feedback path 213 routes the transmit signal being tested via a single-pole multiple-throw switch 806 to the power detector and/or secondary receiver 1132. The single-pole multiple-throw switch 806 is selected/designed to exhibit low capacitance in OFF mode to provide effective high isolation to any transmit signal passing therethrough. In this manner, the adapted characteristics of the test transmit signal routed via one of the transmit paths can be monitored and possibly corrected for with appropriate tuning control of transmit amplifier 322, 326 and/or transmit filter 302, 304 or any other tuneable component(s).

In this example, a second transmit feedback path 1108 is supported that routes a portion of the transmit signal being coupled via coupler 212 to the antenna 201 to the power detector and/or secondary receiver 1132. In this manner, the adapted characteristics of the test or live transmit signal routed via one of the transmit paths and notably taking into account the performance characteristics of the antenna switch 810 and coupler 212 can be monitored and possibly corrected for with appropriate tuning control of transmit amplifier 322, 326 and/or transmit filter 302, 304 or any other tuneable component(s).

As illustrated, the first feedback path 213 and the second transmit feedback path 1108 are input to a single-pole multiple-throw switch 1102, under control of a signal processor or controller, for example controller 214 of FIG. 2. The single-pole multiple-throw switch 1102 routes the selected feedback signal to either the power detector and/or secondary receiver 1132. In this manner, a calibration of the transmit power level can be determined at an input of the multiple-throw multiple-pole antenna switch 806 (or equivalently antenna switch 810) or taking into account the effects of the antenna switch 810 and coupler 212 by selection of the appropriate output path of the multiple-throw multiple-pole antenna switch 810 and preferably isolating the same path in antenna switch 806.

In one example, the antenna switch 810 is selected/designed to exhibit low insertion loss characteristics to minimise loss of transmit power of the transmit radio signal passing therethrough. In one example, the antenna switch 806 is selected/designed to exhibit low capacitance characteristics to maximize isolation when the transmit signal is routed via transmit antenna switch 810 and coupler 212 to second transmit feedback path 1108.

Figure 12:
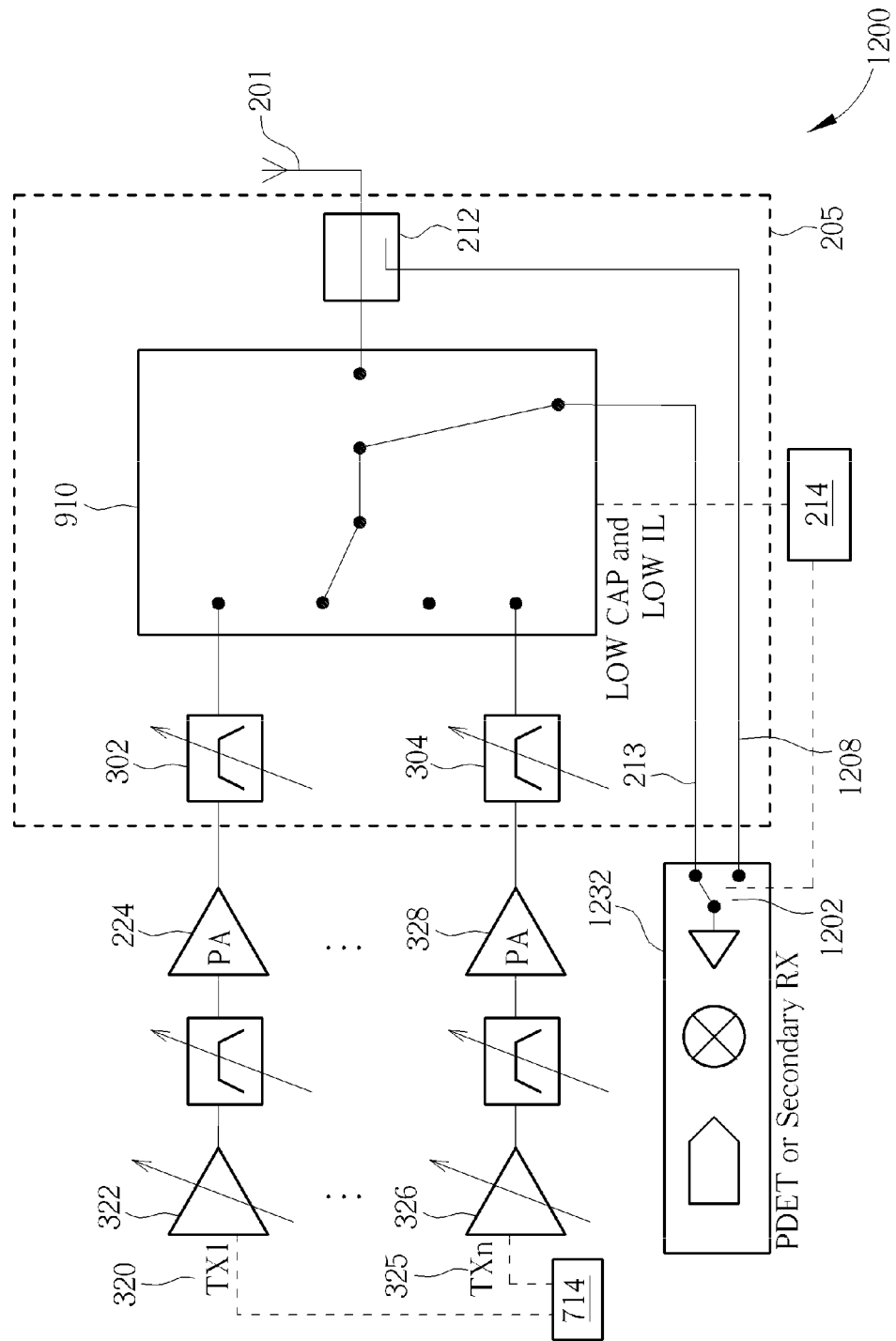
FIG. 12 illustrates a still yet further example of a transmitter architecture of the wireless communication unit of FIG. 2 that supports power detection, according to examples of the invention.

Referring now to FIG. 12, an additional still further example of a transmitter architecture 1200 according to examples of the invention is illustrated. The transmitter architecture 1200 comprises similar implementation details to the transmitter architecture 900 of FIG. 9, and therefore only new elements will be described in order to minimise obfuscation of the description of this example.

In this example transmitter architecture 1200, employing a multiple-throw multiple-pole antenna switch 910, a first feedback path 213 routes the transmit signal being tested via a multiple-throw multiple-pole antenna switch 910 to the power detector and/or secondary receiver 1232. The multiple-throw multiple-pole antenna switch 910 is selected/designed to exhibit both a low insertion loss and a low 'OFF'-mode capacitance effective to any transmit signal passing therethrough, and to maximize isolation when transmit signal is routed via transmit antenna switch 910 and coupler 212 to second transmit feedback path 1208. In this manner, the adapted characteristics of the test transmit signal routed via one of the transmit paths can be monitored and possibly corrected for with appropriate tuning control of transmit amplifier 322, 326 and/or transmit filter 302, 304 or any other tuneable component(s).

In this example, a second transmit feedback path 1208 is supported that routes a portion of the transmit signal being coupled via coupler 212 to the antenna 201 to the power detector and/or secondary receiver 1232. In this manner, the adapted characteristics of the test or live transmit signal routed via one of the transmit paths and notably taking into account the performance characteristics of the antenna switch 910 and coupler 212 can be monitored and possibly corrected for with appropriate tuning control of transmit amplifier 322, 326 and/or transmit filter 302, 304 or any other tuneable component(s).

As illustrated, the first feedback path 213 and the second transmit feedback path 1208 are input to a single-pole multiple-throw switch 1202, under control of a signal processor or controller, for example controller 214 of FIG. 2. The single-pole multiple-throw switch 1202 routes the selected feedback signal to either the power detector and/or secondary receiver 1132. In this manner, a calibration of the transmit power level can be determined at an input of the multiple-throw multiple-pole antenna switch 910 or taking into account the effects of the antenna switch 910 and coupler 212 by selection of the appropriate output path of the multiple-throw multiple-pole antenna switch 910.

In some examples, the tuneable (illustrated as band-pass) filters 302, 304 may be replaced by notch filters or band-stop filters.

It is envisaged that the aforementioned inventive concept can be applied by a semiconductor manufacturer to any integrated circuit comprising radio frequency components, modules or circuits. It is further envisaged that, for example, a semiconductor manufacturer may employ the inventive concept in a design of a stand-alone integrated circuit device or application-specific integrated circuit (ASIC) or may implement the any other sub-system element.

It will be appreciated that, for clarity purposes, the above description has described embodiments of the invention with reference to different functional units and processors. However, it will be apparent that any suitable distribution of functionality between different functional units or processors, for example with respect to the components or circuits residing in either the front end module or transceiver module, may be used without detracting from the invention. Furthermore, functionality illustrated to be performed by separate processors or controllers (e.g. signal processor 208 or controller 214 of FIG. 2) may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components, such as field programmable gate array (FPGA) devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved architecture and method of operation therefor that supports multiple frequency ranges and/or multiple communication standards therefor have been described, wherein the aforementioned disadvantages with prior art arrangements have been substantially alleviated.

What is claimed is:

1. A wireless communication unit comprising:
   a transceiver;
   at least one antenna port operably coupled to the transceiver via at least one antenna switch;
   a signal generator for generating an RF test signal for calibration; and
   a radio frequency part of the transceiver that comprises at least one tuneable radio frequency (RF) component;
   wherein the radio frequency part comprises a coupler located between the at least one tuneable RF component and the at least one antenna switch for coupling the RF test signal to or from the at least one tuneable RF component for calibration; and when the coupler couples the RF test signal to or from the at least one tuneable RF component for calibration, the at least one antenna switch disconnects the RF test signal from the at least one antenna port.

2. The wireless communication unit of claim 1 further comprising a signal processor operably coupled to the radio frequency part, wherein the signal processor is arranged to receive the RF test signal output from the at least one RF tuneable component and adjust the at least one RF tuneable component in response thereto.

3. The wireless communication unit of claim 2 wherein the signal processor is arranged to determine a performance characteristic of the at least one RF tuneable component based on the received RF test signal, compare the determined response signal with a stored performance characteristic and adjust the at least one RF tuneable component in response thereto.

4. The wireless communication unit of claim 2 wherein the coupler comprises at least one radio frequency coupling component arranged to route a signal to the signal processor, wherein the at least one radio frequency coupling component comprises at least one of: at least one capacitive element, at least one directional coupler.

5. The wireless communication unit of claim 2 wherein the signal processor comprises a power detector or a secondary receiver.

6. The wireless communication unit of claim 1 wherein the at least one antenna switch comprises at least one of: at least one single-pole multiple-throw antenna switch, a multiple-throw multi-pole antenna switch.

7. The wireless communication unit of claim 6 wherein the at least one single-pole multiple-throw antenna switch comprises at least one further single-pole multiple-throw antenna switch arranged in parallel with the at least one single-pole multiple-throw antenna switch.

8. The wireless communication unit of claim 1 wherein the radio frequency part comprises a plurality of transmit or receive paths each comprising at least one tuneable RF component.

9. The wireless communication unit of claim 1 wherein the radio frequency part comprises a transmitter operably coupled to a signal processor, wherein the signal processor is arranged to receive the RF test signal input to or output from the at least one antenna switch and adjust the at least one RF tuneable component in response thereto.

10. The wireless communication unit of claim 9 further comprising two feedback paths operably coupled to a dual-pole single-throw switch coupled to the signal processor.

11. The wireless communication unit of claim 9, wherein the signal processor is arranged to determine a performance characteristic of the at least one RF tuneable component based on the received RF test signal.

12. The wireless communication unit of claim 11 wherein the signal processor is arranged to compare the determined response signal with a stored performance characteristic and adjust the at least one RF tuneable component in response thereto.

13. The wireless communication unit of claim 9 wherein the signal processor comprises a power detector or a secondary receiver.

14. The wireless communication unit of claim 1 wherein the at least one antenna port comprises a first antenna port for coupling to a transmit antenna and a second antenna port for coupling to a receive antenna.

15. An integrated circuit comprising:
   a front end module having at least one antenna port operably coupled to a transceiver via at least one antenna switch;
   a radio frequency part of the transceiver that comprises at least one tuneable radio frequency (RF) component;
   an input port operably coupled to a test signal generator for receiving an RF test signal for calibration, wherein the RF test signal is generated by the test signal generator;
   wherein the radio frequency part comprises a coupler located between the at least one RF tuneable component and the at least one antenna switch for coupling the RF test signal to or from the at least one tuneable RF component for calibration; and when the coupler couples the RF test signal to or from the at least one tuneable RF component for calibration, the at least one antenna switch disconnects the RF test signal from the at least one antenna port.

16. The integrated circuit of claim 15 wherein the coupler comprises a radio frequency coupling component comprising at least one from a group of: at least one further single-pole multiple-throw antenna switch arranged in parallel with the at least one single-pole multiple-throw antenna switch; at least one capacitive element; at least one directional coupler.

17. A method of calibrating a transceiver comprising at least one tuneable radio frequency (RF) component and at least one antenna port operably coupled to at least one antenna switch via a receive path, the method comprising:
   generating an RF test signal for calibration of the transceiver;

coupling the RF test signal into a location in between the at least one tuneable RF component and the at least one antenna switch;
processing the RF test signal after passing through the at least one tuneable RF component; and
performing calibration on the processed signal;
wherein when the RF test signal is coupled to the at least one tuneable RF component for calibration, the method further comprises:
utilizing the at least one antenna switch to disconnect the RF test signal from the at least one antenna port.

18. The method of claim 17 further comprising determining whether calibration is required and generating a RF test signal for calibration in response thereto.

19. The method of claim 17 wherein performing calibration on the processed signal comprises comparing at least one performance characteristic of the processed RF test signal with a stored performance characteristic.

20. The method of claim 17 further comprising, following a performing of calibration, determining whether adjustment of the at least one tuneable RF component is required and making an adjustment in response to a positive determination.

21. A wireless communication unit comprising:
a signal generator for generating an RF transmit signal for calibration;
a transmitter that comprises a plurality of tuneable radio frequency (RF) components operably coupled to the signal generator;
at least one multiple throw multiple pole antenna switch for receiving the RF transmit signal passed through one of the plurality of tuneable RF components at an input port;
at least one antenna port operably coupled to the transmitter via the at least one first output port of the multiple throw multiple pole antenna switch; and
a signal processor operably coupled to the transmitter via at least one second output port of the multiple throw multiple pole antenna switch for receiving and processing the RF transmit signal;
wherein when the RF transmit signal is coupled to the one of the tuneable RF component for calibration, the at least one multiple throw multiple pole antenna switch disconnects the RF transmit signal from the at least one antenna port.

* * * * *